United States Patent
Lapalu et al.

(10) Patent No.: US 10,759,967 B2
(45) Date of Patent: Sep. 1, 2020

(54) BITUMEN-POLYMER COMPOSITION AND METHOD FOR THE PREPARATION THEREOF

(71) Applicant: TOTAL MARKETING SERVICES, Puteaux (FR)

(72) Inventors: Laurence Lapalu, Villeurbanne (FR); Mouhamad Mouazen, Nanterre (FR)

(73) Assignee: TOTAL MARKETING SERVICES, Puteaux (FR)

( * ) Notice: Subject to any disclaimer, the term of this patent is extended or adjusted under 35 U.S.C. 154(b) by 0 days.

(21) Appl. No.: 15/781,161

(22) PCT Filed: Nov. 30, 2016

(86) PCT No.: PCT/FR2016/053139
§ 371 (c)(1),
(2) Date: Jun. 4, 2018

(87) PCT Pub. No.: WO2017/093656
PCT Pub. Date: Jun. 8, 2017

(65) Prior Publication Data
US 2018/0298233 A1    Oct. 18, 2018

(30) Foreign Application Priority Data

Dec. 2, 2015   (FR) ................................. 15 61695

(51) Int. Cl.
| | | |
|---|---|---|
| C09D 195/00 | (2006.01) | |
| C08L 101/00 | (2006.01) | |
| C08K 5/09 | (2006.01) | |
| C08L 53/02 | (2006.01) | |
| C08K 5/05 | (2006.01) | |
| C08L 95/00 | (2006.01) | |

(52) U.S. Cl.
CPC .............. *C09D 195/00* (2013.01); *C08K 5/05* (2013.01); *C08K 5/09* (2013.01); *C08L 53/02* (2013.01); *C08L 95/00* (2013.01); *C08L 101/00* (2013.01); *C08L 2555/60* (2013.01); *C08L 2555/80* (2013.01)

(58) Field of Classification Search
CPC .......... C09D 195/00; C08K 5/05; C08K 5/09; C08L 53/02; C08L 95/00; C08L 101/00
See application file for complete search history.

(56) References Cited

U.S. PATENT DOCUMENTS

| | | | |
|---|---|---|---|
| 3,026,568 A | | 3/1962 | Moar |
| 3,997,354 A | | 12/1976 | Pivette et al. |
| 4,332,704 A | | 6/1982 | Marzocchi et al. |
| 4,338,231 A | | 7/1982 | Marzocchi et al. |
| 5,268,029 A | * | 12/1993 | Demangeon ........... C08K 5/175 106/277 |
| 6,013,681 A | * | 1/2000 | Asamori ............. B01F 17/0042 106/277 |
| 2011/0290695 A1 | | 12/2011 | Thomas |
| 2014/0069297 A1 | * | 3/2014 | Rotz ....................... C08L 95/00 106/270 |
| 2015/0240082 A1 | * | 8/2015 | Smith .................... C08G 18/44 524/68 |
| 2015/0291798 A1 | * | 10/2015 | Sautel ...................... C10C 3/14 524/59 |

FOREIGN PATENT DOCUMENTS

| | | |
|---|---|---|
| WO | 2007/058994 A2 | 5/2007 |
| WO | 2008/137394 A1 | 11/2008 |
| WO | 2009/153324 A1 | 12/2009 |
| WO | 2011/013073 A1 | 2/2011 |
| WO | 2012/168380 A1 | 12/2012 |

OTHER PUBLICATIONS

Jun. 5, 2018 International Preliminary Report on Patentability issued in International Patent Application No. PCT/FR2016/053139.
Apr. 5, 2017 International Search Report issued in International Patent Application No. PCT/FR2016/053139.

* cited by examiner

*Primary Examiner* — John E Uselding
(74) *Attorney, Agent, or Firm* — Oliff PLC

(57) ABSTRACT

A process for preparing a bitumen-polymer composition includes mixing and heating a base bitumen-polymer with at least: one compound of general formula (I): $R^1$—$(COOH)_z$ where $R^1$ is a linear or branched, saturated or unsaturated, hydrocarbon chain, including 4 to 68 carbon atoms, and z is an integer from 1 to 4, and a compound (II) selected from the compounds able to react according to an acid-base reaction, an amidation reaction or an esterification reaction, with the carboxylic acid group of the additive (I). Also set forth is the composition obtained by the method and a kit composed of a bitumen-polymer composition including an additive (I), in the form of blocks, and a capsule comprising a compound (II).

22 Claims, No Drawings

BITUMEN-POLYMER COMPOSITION AND METHOD FOR THE PREPARATION THEREOF

TECHNICAL FIELD

The subject of the present invention is a process for preparing a bitumen-polymer composition. This composition may be stored and/or transported under cold conditions in an intermediate state, then converted into a ready-to-apply composition having satisfactory elastic properties. The invention also relates to a kit composed of a bitumen-polymer composition in block form, comprising a first additive and a capsule comprising a second additive, and also to the use of this kit in the process for preparing a bitumen-polymer composition according to the invention having satisfactory elastic properties.

PRIOR ART

Bitumen-polymer compositions have been used in the road sector for numerous years, mainly for the manufacture of road carriageways. These bitumen-polymer compositions have improved mechanical and rheological properties compared to conventional bitumen compositions; they especially have elastic properties superior to those of conventional bitumen compositions.

However, as for all existing road bitumens, the bitumen-polymer compositions are stored and transported under hot conditions in bulk, in tanker trucks or by boats at high temperatures of the order of 120° C. to 200° C. However, the storage and transportation of bitumen under hot conditions has certain drawbacks. Firstly, the transportation of bitumen under hot conditions in liquid form is considered to be dangerous and it is highly restricted from a regulatory perspective.

This mode of transportation does not present particular difficulties when the transportation equipment and infrastructures are in good condition. If this is not the case, it can become problematic: if the tanker truck is not sufficiently lagged, the bitumen may become viscous during an excessively long trip. Bitumen delivery distances are therefore limited. Secondly, maintaining bitumen at high temperatures in tanks or in tanker trucks consumes energy. In addition, maintaining the bitumen at high temperature for a given period of time can affect the properties of the bitumen, especially due to aging phenomena, and thus change the final performance levels of the bituminous mix.

In order to overcome the problems of transporting and storing bitumen under hot conditions, solutions for transporting and storing in packaging under cold conditions have been developed. This mode of transportation of bitumen in packaging under cold conditions represents only a minimal fraction of the amounts transported throughout the world, but it corresponds to very real needs for geographic regions which are difficult and expensive to access using conventional transportation means.

By way of example, mention may be made of transporting the bitumen at ambient temperature in metal drums. This means is increasingly questionable from an environmental perspective since the cold bitumen stored in the drums must be reheated before it is used as road binder. However, this operation is difficult to carry out for this type of packaging and the drums constitute waste after use. Furthermore, the storage of bitumen under cold conditions in drums results in losses since the bitumen is very viscous and a part of the product remains on the walls of the drum when the bitumen is transferred into the tanks of production units. With regard to the handling and transportation of bituminous products in these drums, they can prove to be difficult and dangerous if specialized equipment for handling the drums is not available at the transporters' premises or at the site where the bitumen is used. Moreover, the drums serving to transport the bitumen are not recovered again to transport bitumen and consequently generate additional waste to be retreated.

The packaging of bituminous products in paper bags or bags made of thermoplastic material such as polypropylene or polyethylene has been the subject of recent developments. By way of example, patent application US 2011/0290695 describes a system for distributing and packaging bituminous products in block form. Each bitumen block is surrounded by a film of bituminous composition composed of approximately 10 to 30% by weight of natural bitumen and of approximately 5 to 25% by weight of a synthetic rubber polymer. The film of bituminous composition is melted with the bituminous product and is entirely compatible with the molten bitumen. However, it has been observed that bituminous products packaged in the form of paper bags or bags made of thermoplastic material may creep during handling thereof, storage thereof and transportation thereof, since the bags or films made of thermoplastic material may be pierced, increasing the risks of deformation and of leakage, especially when the external temperature is high. When the bags or films made of thermoplastic material are pierced, the bitumen seeps out and the bags or blocks surrounded by film made of thermoplastic material stick to one another It becomes impossible to handle the bags or blocks surrounded by film made of thermoplastic material which are thus damaged, rendering them unusable.

Document U.S. Pat. No. 4,332,704 describes a bitumen composition formed by reaction of a bitumen with a carboxylic anhydride or acid and a polyol. The resulting bitumen modified by a polyester may be crosslinked by means of a vulcanization agent.

Document U.S. Pat. No. 4,338,231 describes a bitumen composition formed by reaction of a bitumen with a carboxylic anhydride or acid and a polyol, followed by a reaction with a polyester and a vinylaromatic monomer.

Despite the recent developments in packaging for bituminous products, there is still a need to find a solution for the storage and transportation of road bitumens and bituminous materials under cold conditions that makes it possible to overcome the abovementioned drawbacks.

In particular, the aim of the present invention is to propose an improved bitumen-polymer composition that is transportable and/or storable under cold conditions.

Another aim of the invention is to propose a bitumen/polymer composition enabling easy handling of the road bitumen during stock handling operations.

Another aim of the invention is to propose an ecological and economical process for transporting road bitumen and avoiding the use of additional means for maintaining at high temperature said bitumen during the transportation and/or storage.

This aim has been achieved by virtue of the addition of an acid compound to the bitumen-polymer base.

Moreover, the addition of additives, especially of acid compounds, to a bitumen-polymer base is not always without an impact on the properties of the composition, in particular on the properties of use thereof, and especially the elastic properties of the bitumen-polymer compositions.

Another aim of the invention was to provide a bitumen/polymer composition that is storable and transportable under cold conditions and that has elastic properties comparable to those of bitumen-polymer compositions not comprising acid compounds.

One aim of the present invention is to provide a bitumen/polymer composition and a process for preparing this composition, such that the elastic properties of the bitumen-polymer compositions obtained are comparable to those of bitumen-polymer compositions without an acid compound.

In particular, the aim of the present invention is to provide a bitumen-polymer composition which, in an intermediate state, is storable and/or transportable under cold conditions and a process making it possible to restore the elastic properties, especially the elastic recovery, of these bitumen-polymer compositions.

Another aim of the present invention is to provide a kit making it possible to prepare, from a bitumen-polymer composition that is storable and/or transportable under cold conditions, a bitumen-polymer composition, the elastic properties of which are comparable to those of bitumen-polymer compositions without an acid compound.

SUBJECT OF THE INVENTION

The invention relates to a process for preparing a bitumen-polymer composition, comprising:

a) the preparation of a bitumen-polymer composition (BPa) comprising at least one bitumen-polymer base and an additive of general formula (I) $R^1$—$(COOH)_z$, in which $R^1$ is a linear or branched, saturated or unsaturated, hydrocarbon-based chain comprising from 4 to 68 carbon atoms, and z is an integer varying from 1 to 4, b) hot-mixing of the bitumen-polymer composition (BPa) and of a compound (II) selected from compounds capable of reacting according to an acid-base reaction, an amidation reaction or an esterification reaction with a carboxylic acid group of the additive (I).

According to a preferred embodiment, the polymer is an elastomer.

According to a preferred embodiment, the process comprises at least one step of storage and/or transportation under cold conditions of the composition (BPa) between steps a) and b).

According to a preferred embodiment, the composition (BPa) is stored and/or transported in the form of bitumen blocks.

According to a preferred embodiment, the bitumen-polymer composition (BPa) comprises from 0.1% to 5% by weight of the additive (I) relative to the total weight of the bitumen-polymer composition (BPa).

According to a preferred embodiment, step b) of the process comprises the steps of:

i) heating the bitumen-polymer composition (BPa) to a temperature of between 100° C. and 200° C. under stirring, until a homogeneous mixture is obtained, ii) adding the compound (II) simultaneously with or subsequent to step According to a preferred embodiment, the compound (II) is selected from:

a nitrogenous compound having a molecular weight of greater than 90 g·mol$^{-1}$ and selected from polyamines with fatty chain(s), an alcohol having a boiling point of greater than or equal to 150° C., a basic organic or inorganic metal salt selected from alkali metal salts, alkaline earth metal salts, and mixtures thereof, and the mixtures of these compounds.

According to a yet further preferred embodiment, the compound (II) is selected from polyamines with fatty chain(s) obtained by reacting:

polyalkylenepolyamines with fatty chain(s) of general formula (III):

$$R\text{—}NH\text{—}(CH_2\text{—}CH_2\text{—}CH_2\text{—}NH)_n\text{—}H \quad (III)$$

in which R represents a linear, saturated or unsaturated, hydrocarbon-based chain comprising from 8 to 22 carbon atoms, and n represents an integer from 2 to 5; with formic acid.

Advantageously, the compound (II) is a nitrogenous compound of general formula (IIIa):

$$R\text{—}\!\left(\!\underset{H}{\overset{H}{N}}\text{—}\underset{H_2}{C}\text{—}\underset{H_2}{C}\text{—}\underset{H_2}{C}\!\right)_{\!p}\!\text{—}N\!\diagup\!\diagdown\!N \quad (IIIa)$$

in which R represents a linear, saturated or unsaturated, hydrocarbon-based chain comprising from 8 to 22 carbon atoms and p represents an integer equal to (n−1).

According to another preferred embodiment, the compound (II) is an alcohol which comprises 1, 2 or 3 —OH group(s) and a linear or branched, saturated or unsaturated, carbon-based chain having from 2 to 36 carbon atoms.

Advantageously, the compound (II) is glycerol.

According to a preferred embodiment, the compound (II) is a basic inorganic metal salt in alkali metal or alkaline earth metal oxide or hydroxide form, such as the hydroxides or oxides of lithium, sodium, potassium, magnesium or calcium. According to a preferred embodiment, the content of the compound (II) added in step ranges from 0.05% to 5% by weight, preferably from 0.05% to 3% by weight, more preferentially from 0.1% to 2% by weight, relative to the total weight of the bitumen-polymercomposition (BPa) of step i).

According to a preferred embodiment, the additive (I) is a diacid of general formula HOOC—$C_wH_{2w}$—COOH, in which w is an integer varying from 4 to 22.

According to a yet further preferred embodiment, the additive (I) is a diacid selected from the group consisting of adipic acid, pimelic acid, suberic acid, azelaic acid, sebacic acid, undecanedioic acid, 1,2-dodecanedioic acid and tetradecanedioic acid, Another subject of the invention is a bitumen-polymer composition obtained by the process described above.

According to a preferred embodiment, the composition has an elastic recovery, measured at 25° C. according to standard NE EN 13398, of at least 70% relative to the elastic recovery of the noncrosslinked bitumen-polymer base measured under the same conditions.

The invention also relates to the use of the composition defined above for the manufacture of a surface dressing, a hot bituminous mix, a warm bituminous mix, a cold bituminous mix, a cold-poured bituminous mix or an emulsion-treated gravel, said composition being combined with recycled milled products and/or aggregates.

The invention also relates to a kit capable of being used in the implementation of the process as claimed in any one of the preceding claims, comprising at least:

a bitumen-polymer composition (BPa) comprising at least one bitumen-polymer base and an additive (I), the composition being solid under cold conditions and in divided form, a capsule comprising a compound (II).

According to a preferred embodiment of the kit, the bitumen-polymer composition (BPa) is in the form of block(s).

According to a preferred embodiment of the kit, the bitumen-polymer composition (BPa) comprises, on one face thereof, a cavity making it possible to house all or part of the capsule.

According to a preferred embodiment of the kit, the capsule is removably housed entirely or partially in said cavity.

According to a preferred embodiment of the kit, the capsule comprises a casing made of hot-melt plastic film.

The invention also relates to the use of the kit as defined above in the process for preparing a bitumen-polymer composition according to the invention.

DETAILED DESCRIPTION

The aims that the applicant has set itself have been achieved by virtue of developing a bitumen-polymer composition resulting from the mixing and the heating of the bitumen-polymer base with a compound of general formula (I) $R^1$—$(COOH)_z$, in which $R^1$ is a linear or branched, saturated or unsaturated, hydrocarbon-based chain comprising from 4 to 68 carbon atoms, and z is an integer varying from 1 to 4, and with a compound (II) selected from compounds capable of reacting according to an acid-base reaction, an amidation reaction or an esterification reaction with a carboxylic acid group of the additive (I), These aims have been achieved by virtue of developing a process comprising:

on the one hand, preparing a bitumen-polymer composition (BPa) comprising the additive of general formula (I) defined above, this composition being storable and/or transportable under cold conditions, on the other hand, hot-mixing the bitumen-polymer composition (BPs) and the compound (II).

This process makes it possible to convert a bitumen-polymer composition (BPs) that is storable and/or transportable under cold conditions into a bitumen-polymer composition (BPb), by addition of a compound (II), with a view to the application thereof, such that the elastic properties of said bitumen-polymer composition (BPb) are comparable to the elastic properties of a bitumen-polymer base or of a conventional bitumen-polymer composition not comprising additive (I).

This composition may be stored, transported and/or sold in the form of a kit comprising at least:

a bitumen-polymer composition (BPs) comprising the additive (I), solid under cold conditions and in divided form, a compound (II).

Bitumen-polymer composition is intended to mean a bituminous composition consisting of one or more bitumen bases and comprising one or more polymers. The bitumen-polymer composition is preferably intended for a road application. Advantageously, the bitumen-polymer composition is used as road binder for manufacturing bituminous mixes, in combination with aggregates according to any known process. The bituminous mixes are used as materials for the construction and maintenance of road foundations and their surfacing, and also for carrying out all roadworks. Mention may, for example, be made of surface coatings, hot bituminous mixes, cold bituminous mixes, cold-poured bituminous mixes, emulsion-treated gravel, base layers, bond layers, tie layers and running layers, and other combinations of a bituminous binder and of the road aggregate having particular properties, such as anti-rutting layers, draining bituminous mixes, or asphalts (mixture between a binder and aggregates of the sand type).

Conventional bitumen-polymer composition is intended to mean a bitumen-polymer composition not comprising additive (I) or not having been obtained by heating a bitumen-polymer composition comprising an additive (I).

Preparation of the Bitumen-Polymer Composition (BPa) that is Storable and/or Transportable under Cold Conditions According to the invention, a bitumen-polymer composition (BPa) that is storable and/or transportable under cold conditions is prepared by bringing into contact at least:

a bitumen base, a polymer, a compound of general formula (I): $R^1$—$(COOH)_z$, in which $R^1$ is a linear or branched, saturated or unsaturated, hydrocarbon-based chain comprising from 4 to 68 carbon atoms, and z is an integer varying from 1 to 4.

Preferably, a bitumen-polymer composition (BPa) that is storable and/or transportable under cold conditions is prepared by:

bringing into contact at least one bitumen base and a polymer, then adding, to the mixture obtained beforehand, a compound of general formula (I): $R^1$—$(COOH)_z$, in which $R^1$ is a linear or branched, saturated or unsaturated, hydrocarbon-based chain comprising from 4 to 68 carbon atoms, and z is an integer varying from 1 to 4.

Among the bitumen bases of use according to the invention, mention may first of all be made of bitumens of natural origin, those contained in natural bitumen or natural asphalt deposits or bituminous sands and bitumens originating from the refining of crude oil. The bitumen bases according to the invention are advantageously selected from bitumen bases originating from the refining of crude oil. The bitumen bases may be selected from bitumen bases or mixtures of bitumen bases originating from the refining of crude oil, in particular bitumen bases containing asphaltenes. The bitumen bases may be obtained by conventional processes for manufacturing bitumen bases in refining, in particular by direct distillation and/or vacuum distillation of oil. These bitumen bases can optionally be visbroken and/or deasphalted and/or air-rectified. The various bitumen bases obtained by means of refining processes may be combined with one another to obtain the best technical compromise. The bitumen base may also be a bitumen base from recycling. The bitumen bases may be bitumen bases of hard grade or of soft grade. The bitumen bases according to the invention have a penetrability, measured at 25° C. according to standard EN 1426, of between 5 and 300 1/10 mm, preferably between 10 and 100 1/10 mm, more preferentially between 30 and 100 1/10 mm.

As is well known, the "needle penetrability" measurement is carried out by means of an NF EN 1426 standardized test at 25° C. ($P_{25}$). This characteristic of penetrability is expressed in tenths of a millimeter (dmm or 1/10 mm). The needle penetrability, measured at 25° C., according to the NF EN 1426 standardized test, represents the measurement of the penetration of a needle, the weight of which with its support is 100 g, into a bitumen sample, after a time of 5 seconds. The NF EN 1426 standard replaces the approved NE T 66-004 standard of December 1986 with effect from 20 Dec. 1999 (decision of the Directorate General of AFNOR of 20 Nov. 1999).

The polymer included in the bitumen-polymer composition according to the invention is a known elastomer for bitumen, preferably selected from SB copolymers (copolymer containing styrene and butadiene blocks), SBS (copolymer containing styrene/butadiene/styrene blocks), SIS (styrene/isoprene/styrene), SBS* (star-branched styrene/butadiene/styrene block copolymers), SBR (styrene-b-butadiene rubber), EPDM (modified ethylene/propylene/diene), polychloroprene, polynorbornene, natural rubber, polybutene, polyisobutylene, SEBS (copolymer of styrene, ethylene, butylene and styrene).

Mention may also be made of the elastomers produced from styrene monomers and butadiene monomers, enabling crosslinking without a crosslinking agent, such as described in documents WO2007/058994 and WO2008/137394 and also by the applicant in patent application WO2011/013073.

According to a particular embodiment of the invention, the bitumen-polymer composition (BPa) comprises from 0.5% to 10% by weight, preferably from 3% to 10% by weight, more preferentially from 5% to 10% by weight of polymer, relative to the total weight of said composition.

According to another particular embodiment of the invention, the bitumen-polymer composition (BPa) comprises from 0.5% to 10% by weight, preferably from 1% to 6% by weight, more preferentially from 1.5% to 4% by weight of polymer, relative to the total weight of said composition.

Advantageously, the bitumen-polymer composition (BPa) that is storable and/or transportable under cold conditions according to the invention is a crosslinked bitumen/polymer composition.

The sulfur-donating coupling agents of use for crosslinking the polymer included in the bitumen-polymer composition (BPa) are highly varied in nature and are selected depending on the polymer to be crosslinked.

The sulfur-donating coupling agent is advantageously selected from the group consisting of elemental sulfur, hydrocarbyl polysulfides, sulfur-donating vulcanization accelerators, mixtures of such products with one another and/or with non-sulfur-donating vulcanization accelerators.

The elemental sulfur capable of being used to partially or entirely form the crosslinking agent is advantageously flowers of sulfur and preferably crystalline sulfur in the orthorhombic form known under the name of α-sulfur.

The additive compound corresponds to the following general formula (I):

$$R^1-(COOH)_z \quad (I)$$

in which $R^1$ is a linear or branched, saturated or unsaturated, hydrocarbon-based chain comprising from 4 to 68 carbon atoms, preferably from 4 to 54 carbon atoms, more preferentially from 4 to 36 carbon atoms, and z is an integer varying from 1 to 4, preferably from 2 to 4, more preferentially equal to 2.

The chemical additives corresponding to the formula (I) may advantageously be monoacids (z=1), diacids (z=2), triacids (z=3) or tetracids (z=4). The preferred chemical additives are diacids with z=2. The group $R^1$ is preferably a linear and saturated hydrocarbon-based chain of formula $C_wH_{2w}$, with w being an integer varying from 4 to 22, preferably from 4 to 12.

The chemical additives have, in particular, the general formula $HOOC-C_wH_{2w}-COOH$ in which w is an integer varying from 4 to 22, preferably from 4 to 12. These chemical additives correspond to the above formula (I) in which z=2 and $R^1=C_wH_{2w}$.

The preferred diacids are as follows:
adipic acid or 1,6-hexanedioic acid, with w=4
pimelic acid or 1,7-heptanedioic acid, with w=5
suberic acid or 1,8-octanedioic acid, with w=6
azelaic acid or 1,9-nonanedioic acid, with w=7
sebacic acid or 1,10-decanedioic acid, with w=8
undecanedioic acid, with w=9
1,2-dodecanedioic acid, with w=10
tetradecanedioic acid, with w=12.

Advantageously, the diacid (I) is sebacic acid.

The diacids may also be diacid dimers of unsaturated fatty acid(s), that is to say dimers formed from at least one unsaturated fatty acid, for example from a single unsaturated fatty acid or from two different unsaturated fatty acids. Diacid dimers of unsaturated fatty acid(s) are conventionally obtained by an intermolecular dimerization reaction of at least one unsaturated fatty acid (Diels-Alder reaction, for example). Preferably, a single type of unsaturated fatty acid is dimerized. They are derived in particular from the dimerization of an unsaturated fatty acid, especially a $C_6$ to $C_{34}$, especially a $C_{12}$ to $C_{22}$, in particular a $C_{16}$ to $C_{20}$, and more particularly a $C_{18}$ unsaturated fatty acid. A preferred fatty acid dimer is obtained by dimerization of linoleic acid, the dimer being subsequently able to be partially or totally hydrogenated. Another preferred fatty acid dimer has the formula  $HOOC-(CH_2)_7-CH=CH-(CH_2)_7-COOH$. Another preferred fatty acid dimer is obtained by dimerization of methyl linoleate. Likewise, it is possible to find triacids of fatty acids and tetracids of fatty acids, obtained respectively by trimerization and tetramerization of at least one fatty acid.

According to a particular embodiment of the invention, the bitumen-polymer composition (BPa) comprises from 0.1% to 5% by weight, preferably from 0.5% to 4% by weight, more preferentially from 1% to 2.5% by weight of the additive (I), relative to the total weight of the bitumen-polymer composition (BPa).

According to a particular embodiment of the invention, the bitumen-polymer composition (BPa) comprising an additive of formula (I) may also additionally comprise other additives such as adhesion agents and/or surfactants; waxes of animal or vegetable origin or hydrocarbon waxes; paraffins such as polymethylene paraffins and polyethylene paraffins; fluxes such as oils based on animal and/or vegetable fatty substances or hydrocarbon oils of petroleum origin; resins of vegetable origin such as rosins; antifoam additives; detergent additives and/or corrosion inhibitors; slip additives or antiwear agents; crystallization-modifying additives; additives which inhibit paraffin deposits; additives which lower the pour point; modifiers of the rheology at low temperature; antioxidants; metal passivators; acidity neutralizers; additives that make it possible to lower the mixing temperature of asphalts and bituminous mixes; additives that make it possible to improve the adhesion of bituminous binders to fillers and aggregates, such as polyisobutylene succinimides; acids, such as polyphosphoric acid, or diacids, in particular fatty diacids; vulcanization accelerators such as zinc 2-mercaptobenzothiazole, zinc dibutyldithiocarbamate, tetramethylthiuram monosulfide.

The additives other than the additive of formula (I) are used according to the amounts well known to those skilled in the art, depending on the nature of the additive, depending on the bitumen base and the expected properties.

According to another particular embodiment of the invention, the bitumen-polymer composition (BPa) comprising an additive of formula (I) may also additionally comprise an olefinic polymer adjuvant.

The olefinic polymer adjuvant is preferably selected from the group consisting of (a) ethylene/glycidyl (meth)acrylate copolymers; (b) ethylene/monomer A/monomer B terpolymers and (c) copolymers resulting from the grafting of a monomer B onto a polymer substrate.

(a) The ethylene/glycidyl (meth)acrylate copolymers are advantageously selected from random or block, preferably random, copolymers of ethylene and of a monomer selected from glycidyl acrylate and glycidyl methacrylate, comprising from 50% to 99.7% by weight, preferably from 60% to 95% by weight, more preferentially from 60% to 90% by weight, of ethylene.

(b) The terpolymers are advantageously selected from random or block, preferably random, terpolymers of ethylene, of a monomer A and of a monomer B.

The monomer A is selected from vinyl acetate and $C_1$ to $C_6$ alkyl acrylates or methacrylates.

The monomer B is selected from glycidyl acrylate and glycidyl methacrylate. The ethylene/monomer N monomer B terpolymers comprise from 0.5% to 40% by weight, preferably from 5% to 35% by weight, more preferentially from 10% to 30% by weight, of units derived from the monomer A, and from 0.5% to 15% by weight, preferably from 2.5% to 15% by weight, of units derived from the monomer B, the rest being formed from units derived from ethylene.

(c) The copolymers resulting from the grafting of a monomer B, selected from glycidyl acrylate and glycidyl methacrylate, onto a polymer substrate. The polymer substrate consists of a polymer selected from polyethylenes, especially low-density polyethylenes, polypropylenes, random or block, preferably random, copolymers of ethylene and of vinyl acetate, and random or block, preferably random, copolymers of ethylene and of $C_1$ to $C_6$ alkyl acrylate or methacrylate, comprising from 40% to 99.7% by weight, preferably from 50% to 99% by weight, of ethylene. Said grafted copolymers comprise from 0.5% to 15% by weight, preferably from 2.5% to 15% by weight, of grafted units derived from the monomer B.

The olefinic polymer adjuvant is preferably selected from the (b) ethylene/monomer A/monomer B terpolymers described above.

Advantageously, the olefinic polymer adjuvant is selected from random terpolymers of ethylene, of a monomer A selected from $C_1$ to $C_6$ alkyl acrylates or methacrylates and of a monomer B selected from glycidyl acrylate and glycidyl methacrylate, comprising from 0.5% to 40% by weight, preferably from 5% to 35% by weight, more preferentially from 10% to 30% by weight, of units derived from the monomer A, and from 0.5% to 15% by weight, preferably from 2.5% to 15% by weight, of units derived from the monomer B, the rest being formed from units derived from ethylene.

According to a particular embodiment of the invention, the bitumen-polymer composition (BPa) additionally comprises from 0.05% to 15% by weight, preferably from 0.1% to 10% by weight, more preferentially from 0.5% to 6% by weight, of the olefinic polymer adjuvant, relative to the total weight of the bitumen-polymer composition (BPa).

The bitumen-polymer composition (BPa) is prepared by hot-mixing the components. Work is carried out at manufacturing temperatures of between 100° C. and 200° C., preferably between 140° C. and 200° C., more preferentially between 140° C. and 170° C., with stirring for a duration of at least 10 minutes, preferably of between 30 minutes and 10 hours, more preferentially between 1 hour and 6 hours. Manufacturing temperature is intended to mean the heating temperature of the bitumen base before mixing and also the mixing temperature. The temperature and the duration of heating vary depending on the amount of bitumen used and are defined by standard NF EN 12594.

The bitumen-polymer composition (BPs) is transportable and/or storable under cold conditions, said bitumen-polymer composition (BPs) being transported and/or stored in divided form.

Transportable and/or storable under cold conditions is intended to mean transportation and/or storage at a temperature lower than 100° C., The temperature is preferably between 20° C. and 90° C., preferably between 20° C. and 80° C., more preferentially between 20° C. and 70° C.

Divided form is intended to mean that the composition is packaged in separate individual units, enabling the handling thereof by an individual or by a machine, unlike a composition prepared and stored under hot conditions in a tank or a reactor.

According to a preferred embodiment, the bitumen-polymer composition (BPa) is packaged in the form of bitumen blocks. According to another embodiment, the bitumen-polymer composition could be in the form of granules or particles.

According to a particular embodiment of the invention, the bitumen-polymer composition (BPa) according to the invention is in the form of bitumen block(s).

The bitumen block according to the invention preferably has a volume of between 1000 $cm^3$ and 50 000 $cm^3$, preferably between 5000 $cm^3$ and 30 000 $cm^3$, more preferentially between 10 000 $cm^3$ and 25 000 $cm^3$, even more preferentially between 14 000 $cm^3$ and 25 000 $cm^3$.

When the bitumen block is handled manually by a person, the weight of the bitumen block may vary from 1 to 20 kg, and from 20 to 50 kg when handled by two people. When the handling is performed by mechanical equipment, the weight of the bitumen block may vary from 50 to 1000 kg.

The bitumen block is manufactured from a bitumen-polymer composition (BPa) as described above according to any known process, for example according to the manufacturing process described in document US2011/0290695.

Advantageously, the bitumen block is wrapped in a hot-melt film according to any known process, preferably by a film made of polypropylene or polyethylene or a mixture of polyethylene and polypropylene. The bitumen-polymer composition (BPa) packaged as bitumen block wrapped in a hot-melt film has the advantage of being ready to use, that is to say that it can be directly heated as described below in step i) of the process according to the invention. The hot-melt material that melts with the bitumen-polymer composition (BPa) does not affect the properties of said composition. Alternatively, the bitumen block may also be packaged in a siliconized cardboard container according to any known process. In particular, the bitumen block is packaged in a siliconized cardboard container by hot-pouring the bitumen-polymer composition comprising an additive into a cardboard container, the wall of the inner face of which is siliconized, then cooled, the dimensions of the cardboard container being suited to the desired weight and/or volume of the bitumen block.

In this variant, when the bitumen block is packaged in a cardboard container, prior to step i) of the process of the invention, the bitumen block is removed from the cardboard container.

When the block of bitumen-polymer composition (BPa) according to the invention is wrapped in a hot-melt film or is packaged in a cardboard container, the applicant has demonstrated that the deterioration of said hot-melt film or of said cardboard container during the transportation and/or storage under cold conditions of said bitumen block did not lead to creeping of the bitumen. Consequently, the bitumen blocks according to the invention retain their initial form and do not stick to one another during the transportation and/or storage thereof under cold conditions, even if the hot-melt film or the cardboard container is damaged. The absence of creep of the bitumen-polymer composition in block form during the transportation and/or storage thereof under cold conditions is due to the presence of at least one chemical additive of formula (I) within the bitumen-polymer composition.

According to another embodiment, the bitumen-polymer composition (BPa) according to the invention is in the form of granules.

The bitumen granules are obtained by shaping the bitumen-polymer composition (BPa) as described above according to any known process, for example according to the manufacturing process described in document U.S. Pat. No. 3,026,568, document WO 2009/153324 or document WO 2012/168380. As is known, the granules may be shaped by draining, in particular using a drum. Other techniques may be used in the process for manufacturing the bitumen granules, in particular molding, extrusion, etc.

According to this variant, advantageously, the bitumen granules additionally comprise at least one anti-agglomerating agent, preferably of inorganic or organic origin, According to this variant, advantageously, the bitumen granules are covered over at least part of their surface with an anti-agglomerating agent, preferably over the whole of their surface.

Once shaped, these granules have a high load-bearing strength. The consequence of these properties is that the bitumen granules formulated in this way may be stored and/or transported without sticking to one another or agglomerating, without deforming, and retain their consistency even at high ambient temperature (50° C.).

Preparation of the Ready-to-Apply Bitumen-Polymer Composition (BPb)

The process for preparing a ready-to-apply bitumen-polymer composition (BPb), especially in the form of road bitumen, is carried out starting from a bitumen-polymer composition (BPa) comprising the additive of general formula (I).

According to a preferred embodiment of the invention, the bitumen-polymer composition (BPa) has been stored and/or transported in solid divided form, in particular in the form of bitumen blocks, between its manufacture and its use in the preparation of a ready-to-apply bitumen-polymercomposition (BPb).

The process comprising at least one step of hot-mixing of the bitumen-polymer composition (BPa) and of the compound (II) capable of reacting according to an acid-base reaction, an amidation reaction or an esterification reaction with the carboxylic acid group of the additive (I).

This process comprises the steps of:

i) heating a bitumen-polymer composition (BPa), comprising the additive of general formula (I), to a temperature of between 100° C. and 200° C. under stirring, until a homogeneous mixture is obtained, ii) adding the compound (II) simultaneously with or subsequent to step i), iii) obtaining a ready-to-apply bitumen-polymer composition (BPb).

It has been observed that the bitumen-polymer composition (BPb) has highly satisfactory elastic properties, especially an elastic recovery, measured at 25° C. according to standard NE EN 13398, of greater than or equal to 70%.

According to one embodiment of the invention, the temperature and the duration of heating of step i) may vary depending on the amount of bitumen used, and they are defined by standard NF EN 12594.

Preferably, the heating of step i) is between 120° C. and 200° C., more preferentially between 140° C. and 200° C., even more preferentially between 140° C. and 170° C. Preferably, the stirring of step i) is carried out for a duration of at least 15 minutes, more preferentially between 15 minutes and 10 hours, even more preferentially between 15 minutes and 6 hours.

According to a particular embodiment of the invention, during step i), the composition (BPa) may additionally be mixed and heated with one or more bitumen bases not comprising polymer and not comprising additive of formula (I).

As illustrated in the experimental section, the addition of an additive (I) to a bitumen-polymer base may degrade the elastic properties of the bitumen-polymer composition (BPa) compared to the starting bitumen-polymer base. The composition and the process of the invention enable the elastic properties of a bitumen-polymer composition to be restored, relative to the starting bitumen-polymer base. It is observed, especially, that at least 70% of the elastic recovery of the bitumen-polymer composition (BPb) is restored, relative to the bitumen-polymer base or to a conventional bitumen-polymer composition used as starting material, preferably at least 80%.

As is well known, the "elastic recovery" measurement is carried out by means of an NF EN 13398 standardized test at 25° C. (R25). This characteristic of elastic recovery is expressed as a percentage (%). The elastic recovery, measured at 25° C. according to the NF EN 13398 standardized test, represents the measurement of the ability of a bitumen sample to return to its initial form after stretching, after a period of time of 30 minutes with an applied stretching distance of 20 cm.

According to one embodiment of the invention, the bitumen-polymer composition (BPa) comprising an additive (I), that is storable and transportable under cold conditions in divided form, has an elastic recovery, measured at 25° C. according to standard NF EN 13398, of less than or equal to 65%.

The compound (II) is a compound capable of reacting according to an acid-base reaction, an amidation reaction or an esterification reaction with the carboxylic acid group of the additive (I); preferably, the compound (II) is a compound that makes it possible to carry out an acid-base reaction with a carboxylic acid group of the additive (I).

According to a preferred embodiment of the invention, the compound (II) reacting with the additive may be selected from:

a nitrogenous compound having a molecular weight of greater than 90 g·mol$^{-1}$ and selected from polyamines with fatty chain(s), an alcohol having a boiling point of greater than or equal to 150° C., a basic organic or inorganic metal salt, preferably a metal salt selected from alkali metal salts, alkaline earth metal salts, and mixtures thereof, and the mixtures of these compounds.

Advantageously, the compound (II) reacting with the additive may be selected from nitrogenous compounds, preferably a nitrogenous compound having a molecular weight of greater than 90 g·mol$^{-1}$ and selected from polyamines with fatty chain(s).

In this preferred embodiment, the polyamines with fatty chain(s) may be obtained by reacting:

polyalkylenepolyamines with fatty chain(s) of general formula (III):

$$R\text{—}NH\text{—}(CH_2\text{—}CH_2\text{—}CH_2\text{—}NH)_n\text{—}H \quad \text{(III)}$$

in which R represents a linear, saturated or unsaturated, hydrocarbon-based chain comprising from 8 to 22 carbon atoms, and n represents an integer ranging from 2 to 5;
with
formic acid.

Preferably, the nitrogenous compound may be a complex mixture of products comprising amine groups which are unmodified and/or amide groups and/or elements with a cyclic formamidine structure of the tetrahydropyrimidine type, which are obtained, on the one hand, from the carboxylic group provided by formic acid and, on the other hand, from the terminal primary amine group and the amine groups in positions 1 and 3 relative to one another of the polyalkylenepolyamines with fatty chain(s) of formula (III).

As examples of such nitrogenous compounds (III), mention may be made, non limitingly, of tallow propylenetriamine hydrochloride or tallow propylenetriamine. Advantageously, the nitrogenous compound resulting from the reaction between the compound of formula (III) and formic acid is of general formula (IIIa):

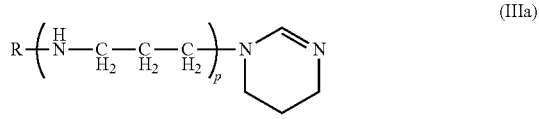

in which R represents a linear, saturated or unsaturated, hydrocarbon-based chain comprising from 8 to 22 carbon atoms and p represents an integer equal to (n−1).

The radical R in the formula (IIIa) has the same structure as the radical R in the formula (III).

More advantageously, the radical R in the formula (IIIa) is a radical containing one or more unsaturations, preferably selected from the group consisting of: alkenyl, alkadienyl, alkatrienyl, alkatetraenyl or else alkapentaenyl, and preferably is a $C_8$ to $C_{20}$ radical.

In practice, the radical R is selected from those of the radicals R which contain from 8 to 20 carbon atoms. Examples of radicals R that are suitable for the nitrogenous compounds used according to the invention are such as 9-decenyl, 2,4-decadienyl, 2,4,6-decatrienyl, 9-dodecenyl, 9-hexadecenyl, 6-octadecenyl, 11-octadecenyl, 9,12,15-octadecatrienyl, 9,11,13,15-octadecatetraenyl, 6,9,12,15-octadecatetraenyl, 9-eicosenyl, 11-eicosenyl, 8,11,14,17-eicosatetraenyl, 5,8,11,14-eicosatetraenyl, 5,8,11,14,17-eicosapentaenyl, 11-docosenyl, 13-docosenyl, 7,19,13,16,17-docosapentaenyl, 15-tetracosenyl.

Indeed, the products of formula (IIIa) may, according to a favored variant, form the essential components of the complex mixture of products resulting from the reaction of (III) with formic acid and which may comprise amine groups which are unmodified and/or amide groups and/or elements with a cyclic formamidine structure of the tetrahydropyrimidine type.

The preparation of nitrogenous compounds of general formula (IIIa) is described in patent U.S. Pat. No. 3,997,354.

A preferred nitrogenous compound of general formula (IIIa) is N-tallow-1-(3-aminopropyl)-1,4,5,6-tetrahydropyrimidine, sold under the name Cecabase® 200 by CECA.

When the compound (II) is an alcohol, the latter may comprise 1, 2 or 3 —OH group(s) and a linear or branched, saturated or unsaturated, carbon-based chain having from 2 to 36 carbon atoms, preferably from 2 to 10 carbon atoms.

Advantageously, the alcohol is glycerol.

When the compound (II) is a basic inorganic metal salt, it is advantageously in alkali metal or alkaline earth metal oxide or hydroxide form, such as the hydroxides or oxides of lithium, sodium, potassium, magnesium or calcium.

The basic inorganic metal salt is advantageously sodium hydroxide.

According to one embodiment of the invention, the content of the compound (II) capable of reacting with the additive (I) added in step ii) of the process of the invention ranges from 0.05% to 5% by weight, preferably from 0.05% to 3% by weight, more preferentially from 0.1% to 2% by weight, relative to the total weight of the bitumen-polymer composition (BPa) heated in step i) of the process of the invention.

Another subject of the invention relates to the bitumen-polymer composition obtained by the process as defined above.

According to one embodiment of the invention, the bitumen-polymer composition obtained by the process as defined above has an elastic recovery, measured at 25° C. according to standard NE EN 13398, of at least 70%.

Another subject of the invention relates to the use of the composition as defined above for the manufacture of a surface dressing, a hot bituminous mix, a warm bituminous mix, a cold bituminous mix, a cold-poured bituminous mix or an emulsion-treated gravel, said composition being combined with recycled milled products and/or aggregates.

Another subject of be invention relates to a kit composed:
of a bitumen-polymer composition (BPa), solid under cold conditions and in divided form, especially in block form as defined above, and
of a capsule comprising a compound (II) as defined above.

According to one embodiment of the invention, the bitumen-polymer composition (BPa) in bitumen block form comprises, on one face thereof, a cavity making it possible to house all or part of the capsule.

According to one embodiment of the invention, the capsule is removably housed entirely or partially in the cavity.

According to this embodiment, the capsule may be a capsule with a soft casing, especially a sachet, or a capsule with a hard casing.

The casing of the capsule is preferably made of hot-melt plastic film, especially made of polyethylene, or made of silicone.

Another subject of the invention relates to the use of the kit as defined above in the process for preparing a ready-to-apply bitumen-polymer composition (BPb) according to the invention.

According to one embodiment of the invention, the bitumen-polymer composition (BPa) in block form and the capsule forming the kit as defined above are used simultaneously or consecutively in the process of the invention.

In a variant, when the bitumen-polymer composition (BPa) in block form and the capsule forming the kit as defined above are used consecutively in the process of the invention, said bitumen-polymer composition (BPa) in block form is heated beforehand according to step i) of the process of the invention, then the capsule comprising the compound (II) is added to the heated bitumen-polymer composition (BPa) according to step ii) of the process of the invention. In this variant, before the heating of the bitumen-polymer composition (BPa), the capsule is removed from the cavity present on one of the faces of the bitumen-polymer composition (BPs) in block form.

In another variant, when the bitumen-polymer composition (BPa) in block form and the capsule forming the kit as defined above are used simultaneously in the process of the invention, steps i) and ii) of the process of the invention are carried out simultaneously.

The various embodiments, variants, preferences and advantages described above for each of the subjects of the invention apply to all the subjects of the invention and may be taken separately or in combination.

EXAMPLES

The invention is illustrated by the following nonlimiting examples. The rheological and mechanical characteristics of the bitumens to which reference is made in these examples are measured in the manner indicated in table 1.

TABLE 1

| Property | Abbreviation | Unit | Measurement standard |
|---|---|---|---|
| Needle penetrability at 25° C. | $P_{25}$ | 1/10 mm | NF EN 1426 |
| Ring and ball softening point | RBSP | ° C. | NF EN 1427 |
| Elastic recovery at 25° C. | R25 | % | NF EN 13398 |

Bitumen blocks $P_2$ and $P_3$
Starting Materials:
- a 13/40 grade bitumen base comprising a crosslinked styrene/butadiene/styrene block copolymer, denoted $B_1$, having a penetrability $P_{25}$ of 36 1/10 mm and an RBSP of 69° C., commercially available from TOTAL under the brand name STYRELF® 13/40;
- a 13/60 grade bitumen base comprising a crosslinked styrene/butadiene/styrene block copolymer, denoted $B_2$, having a penetrability $P_{25}$ of 50 1/10 mm and an RBSP of 76° C., commercially available from TOTAL under the brand name STYRELF 13/60;
- a nitrogenous compound commercially available from CECA under the brand name Cecabase® 200;
- glycerol, commercially available from Prolabo under the name 99% Distilled Glycerol;
- an additive, sebacic acid, commercially available from Copcimétanique.

The amounts in weight percent used for each bitumen, and also their rheological and mechanical properties, are indicated in table 2 below.

TABLE 2

| Bitumen | $B_3$ (control) | $B_4$ | $B_5$ (control) | $B_6$ |
|---|---|---|---|---|
| Bitumen base $B_1$ | 100% | 98.5% | — | — |
| Bitumen base $B_2$ | — | — | 100% | 98.5% |
| Sebacic acid | — | 1.5% | — | 1.5% |
| $P_{25}$ (1/10 mm) | 36 | 17 | 50 | 2 |
| RBSP (° C.) | 69 | 112.5 | 76 | 112 |
| R25 (%) | 84.8 | 52.2 | 88 | n.d | n.d.: not determinable

The bitumen $B_4$ is prepared by introducing the bitumen base $B_1$ into a reactor at 160° C.-165° C. with stirring at 300 rpm, then subsequently the sebacic acid. The mixture is stirred for approximately 1 hour at 160° C.-165° C. to obtain a homogeneous final appearance. The mixture is cooled to ambient temperature.

The bitumen $B_6$ is prepared by introducing the bitumen base $B_2$ into a reactor at 160° C.-165° C. with stirring at 300 rpm, then subsequently the sebacic acid. The mixture is stirred for approximately 1 hour at 160° C.-165° C. to obtain a homogeneous final appearance. The mixture is cooled to ambient temperature.

The bitumen blocks $P_3$, $P_4$, $P_5$ and $P_6$ are prepared respectively from the bitumens $B_3$, $B_4$, $B_5$ and $B_6$ according to the following method.

A weight of approximately 0.5 kg of bitumen is poured at 160° C. into a rectangular steel mold covered with a hot-melt film made of polyethylene/polypropylene. The mold is then cooled to ambient temperature, then removal from the mold is carried out.

Creep Test

A qualitative creep test is carried out beforehand. The bitumen blocks $P_3$, $P_4$, $P_5$ and $P_6$ thus obtained are placed in ovens at different temperatures and under a load of 3.65 kg (+/−50 g) in order to simulate the stacking of the blocks on one another during the transportation and/or storage thereof. Indeed, it is estimated that 5 blocks are stacked vertically on a palette during the transportation and/or storage of the bitumen blocks. Thus, the load of 3.65 kg (+/−50 g) corresponding to the load applied to a 500 g block equates approximately to the load applied to a 25 kg block in a palette containing 40 blocks and having a total weight of approximately 1000 kg.

The mathematical formula making it possible to calculate the load for a 25 kg block within a palette of 40 blocks is
$P=[(M*g)/S]/n$
with M being the load, i.e. approximately 1000 kg, g being the gravitational constant 9.81 m·s$^{-2}$, S being the surface area of the palette, i.e. 1.21 m$^2$, and n being the number of blocks in the palette, i.e. 40.

The blocks are first placed in an oven at a temperature of 40° C. If no creep is observed after a certain amount of time, at most after 3 weeks, new blocks are molded and placed at an oven temperature of 50° C. for at least 7 days. This operation is repeated, increasing the temperature by 10° C. up to a maximum temperature of 80° C., if no creep is observed, or up to the temperature at which significant creep of the blocks is observed, if said temperature is less than 80° C. Creep is reflected visually by deformation of the blocks and flowing of the bitumen.

Table 3 below lists the results of the creep test obtained for the bitumen blocks $P_3$, $P_4$, $P_5$ and $P_6$.

TABLE 3

| Bitumen block | | $P_3$ (control) | $P_4$ | $P_5$ (control) | $P_6$ |
|---|---|---|---|---|---|
| Oven temperature (° C.) | 40 | + | +++ | + | +++ |
| | 50 | − | +++ | − | +++ |
| | 60 | nr* | +++ | nr* | +++ |
| | 70 | nr* | +++ | nr* | +++ |
| | 80 | nr* | ++ | nr* | ++ |

+++: no creep observed after 15 days
++: no creep observed after 7 days
+: creep observed after 3 days
−: significant creep in less than 2 hours
nr*: not relevant; the creep test was not carried out at this temperature, since creep is observed at lower temperatures.

Only the bitumen blocks $P_4$ and $P_6$ do not creep under conventional storage and/or transportation conditions. Nonetheless, as demonstrated in table 2, the elastic properties and especially the elastic recovery of the bitumen-polymer compositions $B_4$ and $B_6$ making it possible to obtain $P_4$ and $P_6$ are degraded compared to the bitumen-polymer compositions $B_3$ and $B_5$ making it possible to obtain $P_3$ and $P_5$.

Restoring the Elastic Properties of $P_4$ and $P_6$

Bitumen-polymer compositions $C_7$ to $C_{10}$ and $C_{11}$ to $C_{12}$ with restored elastic properties, especially with a restored elastic recovery, were obtained respectively from bitumen blocks $P_4$ and $P_6$ according to the process described below.

A bitumen block is placed in a melter and heated to approximately 160° C.-165° C. with stirring for a duration of between 5 and 35 minutes and, simultaneously with the heating of the bitumen block, the nitrogenous compound (Cecabase® 200) or the alcohol (glycerol) is added. The mixture thus obtained is mixed until a homogeneous mixture is obtained.

The mixture thus obtained may subsequently be used for manufacturing bituminous mixes.

Table 4 below lists the different experimental conditions of the process for restoring the elastic properties of the bitumen-polymer compositions according to the invention and their mechanical and rheological properties.

TABLE 4

|  | $B_3$ (control) | $P_4$ | $C_7$ | $C_8$ | $C_9$ | $C_{10}$ | $B_5$ (control) | $P_6$ | $C_{11}$ | $C_{12}$ |
|---|---|---|---|---|---|---|---|---|---|---|
| Duration of heating at 160° C. (min) | 30 | 30 | 5 | 5 | 30 | 30 | — | — | — | — |
| Duration of heating at 165° C. (min) | — | — | — | — | — | — | 30 | 30 | 35 | 35 |
| Content of nitrogenous compound (*) | — | — | 0.24 | 1 | 0.24 | — | — | — | — | — |
| Alcohol content (**) | — | — | — | — | — | 1 | — | — | 1 | 0.5 |
| P25 (1/10 mm) | 36 | 17 | 30 | 38 | 28 | 37 | 50 | 22 | 55 | 53 |
| RBSP (° C.) | 69 | 112.5 | 85 | 69.6 | 81.4 | 76 | 76 | 112 | 74.8 | 75.2 |
| R25 (%) | 84.8 | 52.2 | 70.4 | 84.9 | 71.5 | 83 | 88 | n.d | 86 | 86 |

(*) % by weight relative to the weight of $P_4$ or $P_6$
(**) % by weight relative to the weight of $P_4$ or $P_6$
n.d.: not determinable It is observed that the addition of a nitrogenous compound or of an alcohol during the heating of a bitumen-polymer composition comprising an additive in block form $P_4$ makes it possible to restore the elastic properties, especially the elastic recovery, of the bitumen-polymer compositions $C_7$ to $C_{10}$ obtained from $P_4$ while retaining their mechanical properties, relative to the elastic and mechanical properties of the control bitumen-polymer composition $B_3$.

It is also observed that the addition of an alcohol during the heating of a bitumen-polymer composition comprising an additive in block form $P_6$ makes it possible to restore the elastic properties, especially the elastic recovery, of the bitumen-polymer compositions $C_{11}$ and $C_{12}$ obtained from $P_6$ while retaining their mechanical properties, relative to the elastic and mechanical properties of the control bitumen-polymer composition $B_5$.

More particularly, it is observed that the bitumen-polymer compositions $C_7$ to $C_{10}$ and $C_{11}$ to $C_{12}$ restore at least 70% of the elastic recovery respectively compared to the control bitumen-polymer compositions $B_3$ and $B_5$.

Coating and Passive Adhesiveness Test

Coating with the composition $C_{10}$:

40.08 g of diorite aggregates were weighed and placed in a bowl in the oven at 160° C. 2.35 g of composition $C_{10}$ were then weighed and placed in the oven at 60° C. Once the two constituents were at temperature, the composition $C_{10}$ was poured over the aggregates and manual shearing using a spatula was applied. The bowl was placed in the oven at 160° C. and shearing was applied again until coated aggregates were obtained.

Coating with the composition $C_{11}$:

40.08 g of diorite aggregates were weight and placed in a bowl in the oven at 160° C. 2.35 g of composition $C_{11}$ were then weighed and placed in the oven at 60° C. Once the two constituents were at temperature, the composition $C_{11}$ was poured over the aggregates and manual shearing using a spatula was applied. The bowl was placed in the oven at 160° C. and shearing was applied again until coated aggregates were obtained Passive Adhesiveness:

The coated aggregates obtained respectively with the compositions $C_{10}$ and $C_{11}$ were placed in water at 60° C. overnight. The result is highly satisfactory, since the compositions $C_{10}$ and $C_{11}$ were not removed from the aggregates.

The invention claimed is:

1. A process for preparing a bitumen-polymer composition, the polymer being an elastomer, comprising:
    a) the preparation of a bitumen-polymer composition (BPa) comprising at least one bitumen-polymer base and an additive of general formula (I) $R^1$—$(COOH)_z$, in which $R^1$ is a linear or branched, saturated or unsaturated, hydrocarbon-based chain comprising from 4 to 68 carbon atoms, and z is an integer varying from 1 to 4,
    b) hot-mixing of the bitumen-polymer composition (BPa) and of a compound (II) selected from compounds capable of reacting according to an acid-base reaction, an amidation reaction or an esterification reaction with a carboxylic acid group of the additive (I).

2. The process as claimed in claim 1, wherein it comprises at least one step of storage and/or transportation under cold conditions of the composition (BPa) between steps a) and b).

3. The process as claimed in claim 2, wherein the composition (BPa) is stored and/or transported in the form of bitumen blocks.

4. The process as claimed in claim 1, wherein the bitumen-polymer composition (BPa) comprises from 0.1% to 5% by weight of the additive (I) relative to the total weight of the bitumen-polymer composition (BPa).

5. The process as claimed in claim 1, wherein step b) of the process comprises the steps of:
   i) heating the bitumen-polymer composition (BPa) to a temperature of between 100° C. and 200° C. under stirring, until a homogeneous mixture is obtained,
   ii) adding the compound (II) simultaneously with or subsequent to step i).

6. The process as claimed in claim 1, wherein the compound (II) is selected from:
   a nitrogenous compound having a molecular weight of greater than 90 g·mol$^{-1}$ and selected from polyamines with fatty chain(s),
   an alcohol having a boiling point of greater than or equal to 150° C.,
   a basic organic or inorganic metal salt selected from alkali metal salts, alkaline earth metal salts, and mixtures thereof, and
   mixtures of these compounds.

7. The process as claimed in claim 6, wherein the compound (II) is selected from polyamines with fatty chain(s) obtained by reacting:
   polyalkylenepolyamines with fatty chain(s) of general formula (III):

R—NH—(CH$_2$—CH$_2$—CH$_2$—NH)$_n$—H     (III)

in which R represents a linear, saturated or unsaturated, hydrocarbon-based chain comprising from 8 to 22 carbon atoms, and n represents an integer from 2 to 5;
   with
   formic acid.

8. The process as claimed in claim 7, wherein the compound (II) is a nitrogenous compound of general formula (IIIa):

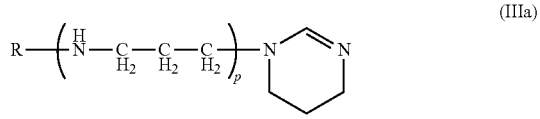

in which R represents a linear, saturated or unsaturated, hydrocarbon-based chain comprising from 8 to 22 carbon atoms, p represents an integer equal to (n−1) and n represents an integer from 2 to 5.

9. The process as claimed in claim 6, wherein the compound (II) is an alcohol which comprises 1, 2 or 3 —OH group(s) and a linear or branched, saturated or unsaturated, carbon-based chain having from 2 to 36 carbon atoms.

10. The process as claimed in claim 9, wherein the compound (II) is glycerol.

11. The process as claimed in claim 6, wherein the compound (II) is a basic inorganic metal salt in alkali metal or alkaline earth metal oxide or hydroxide form.

12. The process as claimed in claim 6, wherein the compound (II) is chosen from the hydroxides or oxides of lithium, sodium, potassium, magnesium or calcium.

13. The process as claimed in claim 1, wherein the content of the compound (II) added in step ii) ranges from 0.05% to 5% by weight, relative to the total weight of the bitumen-polymer composition (BPa) of step i).

14. The process as claimed in claim 1, wherein the additive (I) is a diacid of general formula HOOC—C$_w$H$_{2w}$—COOH, in which w is an integer varying from 4 to 22.

15. The process as claimed in claim 14, wherein the additive (I) is a diacid selected from the group consisting of adipic acid, pimelic acid, suberic acid, azelaic acid, sebacic acid, undecanedioic acid, 1,12-dodecanedioic acid and tetradecanedioic acid.

16. The process as claimed in claim 1, for preparing a bitumen-polymer composition which has an elastic recovery, measured at 25° C. according to standard NF EN 13398, of at least 70% relative to the elastic recovery of the noncrosslinked bitumen-polymer base measured under the same conditions.

17. A process for manufacturing of a surface dressing, a hot bituminous mix, a warm bituminous mix, a cold bituminous mix, a cold-poured bituminous mix or an emulsion-treated gravel, said process comprising preparing a bitumen-polymer composition obtained by the process as claimed in claim 1 further comprising combining said composition with recycled milled products and/or aggregates.

18. A kit capable of being used in the implementation of the process as claimed in claim 1, comprising at least:
   a bitumen-polymer composition (BPa) comprising at least one bitumen-polymer base, the polymer being an elastomer, and an additive (I), the composition being solid under cold conditions and in divided form,
   a capsule comprising a compound (II).

19. The kit as claimed in claim 18, wherein the bitumen-polymer composition (BPa) is in the form of block(s).

20. The kit as claimed in claim 19, wherein the bitumen-polymer composition (BPa) comprises, on one face thereof, a cavity making it possible to house all or part of the capsule.

21. The kit as claimed in claim 20, wherein the capsule is removably housed entirely or partially in said cavity.

22. The kit as claimed in claim 18, wherein the capsule comprises a casing made of hot-melt plastic film.

* * * * *